United States Patent
Friedrich et al.

(10) Patent No.: US 12,146,486 B2
(45) Date of Patent: Nov. 19, 2024

(54) REFRIGERANT COMPRESSOR WITH STATOR ELASTIC SUPPORT

(71) Applicant: BITZER Kuehlmaschinenbau GmbH, Sindelfingen (DE)

(72) Inventors: Axel Friedrich, Leipzig (DE); Andreas Becker, Halle (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 232 days.

(21) Appl. No.: 17/355,710

(22) Filed: Jun. 23, 2021

(65) Prior Publication Data

US 2021/0404457 A1 Dec. 30, 2021

(30) Foreign Application Priority Data

Jun. 24, 2020 (DE) .......................... 102020116691.5
Jul. 9, 2020 (DE) .......................... 102020118191.4

(51) Int. Cl.
*F04B 53/00* (2006.01)
*F04B 25/04* (2006.01)
(Continued)

(52) U.S. Cl.
CPC ............ *F04B 53/003* (2013.01); *F04B 25/04* (2013.01); *F04B 27/1081* (2013.01);
(Continued)

(58) Field of Classification Search
None
See application file for complete search history.

(56) References Cited

U.S. PATENT DOCUMENTS

| | | | | |
|---|---|---|---|---|
| 1,688,891 A | * | 10/1928 | Spreen | ................... H02K 1/185 |
| | | | | 310/410 |
| 2,632,861 A | * | 3/1953 | Morton | ................... H02K 1/185 |
| | | | | 310/431 |

(Continued)

FOREIGN PATENT DOCUMENTS

| | | |
|---|---|---|
| CN | 205605430 U | 9/2016 |
| DE | 10003882 A1 | 8/2001 |

(Continued)

OTHER PUBLICATIONS

Machine Translation of WO 2016/110391 (Obtained from USPTO Search, Copyright 2023 Clarivate Analytics) (Year: 2023).*

(Continued)

*Primary Examiner* — Bryan M Lettman
*Assistant Examiner* — Geoffrey S Lee
(74) *Attorney, Agent, or Firm* — Reinhart Boerner Van Deuren P.C.

(57) ABSTRACT

In a refrigerant compressor comprising an overall housing with a motor housing portion, in which there is arranged a motor chamber having, provided therein, an electric motor comprising a stator and a rotor, and with a compressor housing portion which has a compressor unit, in order to be able to mount the stator as easily as possible it is proposed that the stator is mounted in the motor housing portion by means of supporting elements inserted into the motor housing portion, which supporting elements on the one hand abut against a stator-receiving surface of the motor housing portion and on the other hand surround the stator inserted into the supporting elements on its outer side and support it spring-elastically relative to the stator-receiving surface.

27 Claims, 10 Drawing Sheets

(51) Int. Cl.
*F04B 27/10* (2006.01)
*F04B 27/12* (2006.01)
*F04B 35/04* (2006.01)
*H02K 1/18* (2006.01)

(52) U.S. Cl.
CPC .............. *F04B 27/12* (2013.01); *F04B 35/04* (2013.01); *H02K 1/185* (2013.01)

(56) References Cited

U.S. PATENT DOCUMENTS

| | | | | |
|---|---|---|---|---|
| 3,430,085 | A * | 2/1969 | Mains | H02K 5/203 310/54 |
| 6,164,934 | A | 12/2000 | Niihara et al. | |
| 6,234,768 | B1 * | 5/2001 | Harakawa | H02K 5/207 417/366 |
| 6,817,431 | B1 * | 11/2004 | Rasch | H02K 1/185 180/65.22 |
| 11,211,849 | B2 * | 12/2021 | Banham | H02K 5/203 |
| 2001/0007635 | A1 * | 7/2001 | Yokomachi | F04B 39/064 417/269 |
| 2002/0062657 | A1 * | 5/2002 | Dittrich | F04B 39/125 62/296 |
| 2002/0135244 | A1 * | 9/2002 | Strong | F16D 1/0835 318/258 |
| 2004/0118149 | A1 * | 6/2004 | Tsunoda | F04B 27/1036 62/505 |
| 2004/0124720 | A1 * | 7/2004 | Condamin | H02K 5/24 310/51 |
| 2005/0082921 | A1 * | 4/2005 | Schurter | H02K 5/15 310/58 |
| 2012/0183422 | A1 * | 7/2012 | Bahmata | H02K 1/185 417/423.15 |
| 2015/0003971 | A1 | 1/2015 | Miller et al. | |
| 2018/0291885 | A1 * | 10/2018 | Grybush | F04B 27/0538 |
| 2019/0190345 | A1 * | 6/2019 | Childs | F16F 1/37 |
| 2020/0136470 | A1 * | 4/2020 | Banham | H02K 1/20 |
| 2021/0003321 | A1 | 1/2021 | Friedrich et al. | |

FOREIGN PATENT DOCUMENTS

| | | | | |
|---|---|---|---|---|
| DE | 102012100196 | A1 | | 7/2012 |
| DE | 9320524 | U1 | * | 12/2020 |
| JP | 2007189812 | A | | 7/2007 |
| JP | 2011196244 | A | | 10/2011 |
| RU | 2187706 | C2 | | 8/2002 |
| RU | 2255271 | C2 | | 6/2005 |
| RU | 104647 | U1 | | 5/2011 |
| RU | 2467261 | C2 | | 11/2012 |
| RU | 2702226 | C2 | | 10/2019 |
| RU | 2745598 | C2 | | 3/2021 |
| WO | WO 01/55594 | A1 | | 8/2001 |
| WO | WO 2014166788 | A1 | | 10/2014 |
| WO | WO-2016110391 | A1 | * | 7/2016 ............. H02K 1/185 |
| WO | WO-2019020730 | A1 | * | 1/2019 ............. F16D 1/0835 |
| WO | WO 2019/185121 | A1 | | 10/2019 |

OTHER PUBLICATIONS

Machine Translation of WO 2019/020730 (Obtained from "https://worldwide.espacenet.com/") (Year: 2023).*
Machine Translation of DE9320524 (Obtained from https://worldwide.espacenet.com) (Year: 2024).*

* cited by examiner

REFRIGERANT COMPRESSOR WITH STATOR ELASTIC SUPPORT

CROSS-REFERENCE TO RELATED PATENT APPLICATIONS

This patent application claims the benefit of German applications No. 10 2020 116 691.5, filed Jun. 24, 2020 and No. 10 2020 118 191.4, filed Jul. 9, 2020, the teachings and disclosure of which are hereby incorporated in their entirety by reference thereto.

BACKGROUND OF THE INVENTION

The invention relates to a refrigerant compressor comprising an overall housing with a motor housing portion, in which there is arranged a motor chamber with, provided therein, an electric motor comprising a stator and a rotor, and with a compressor housing portion which has a compressor unit.

Such refrigerant compressors with compressor units, which can be configured as piston compressors, spiral compressors or screw compressors, are known from the prior art and have the problem of arranging the stator as simply as possible on the one hand and on the other hand in such a way that the smallest possible gap between the stator and the rotor can be maintained even in the event of dimensional changes of the motor housing portion.

SUMMARY OF THE INVENTION

In the case of a refrigerant compressor of the type described above, this object is achieved in accordance with the invention in that the stator is mounted in the motor housing portion by means of supporting elements which are inserted into the motor housing portion and which, on the one hand, abut against a stator-receiving surface of the motor housing portion and, on the other hand, surround the stator inserted into the supporting elements on its outer side, in particular over at least three quarters of a circumference thereof, and support it spring-elastically relative to the stator-receiving surface.

The advantage of the solution according to the invention is that the spring-elastic support of the stator relative to the stator-receiving surface makes it possible to compensate for variations in the diameter of the stator-receiving surface of the motor housing portion and at the same time to ensure that the stator is always arranged centered in the motor housing portion, since the supporting elements surrounding the stator and supporting it spring-elastically relative to the stator-receiving surface act on opposite sides of the stator between the latter and the motor housing portion and thus keep the stator centered relative to the motor housing portion both in the event of thermally induced and pressure-induced diameter changes.

This then has the advantage that the gap between the stator and the rotor can be kept as small as possible and thus a high efficiency of the electric motor can be realized.

The spring-elastic supporting elements can be configured in a very wide variety of ways. For example, the supporting elements can be bands that are elastic over their thickness.

A particularly advantageous solution provides that the supporting elements comprise spring-elastic bodies which are dimensioned such that they are in the elastically deformed state in all operating states of the motor housing portion occurring during operation of the refrigerant compressor, i.e., that in no operating state do the spring-elastic bodies enter the range of plastic deformation, which would result in the elastic properties of the spring-elastic bodies changing.

In particular, it is advantageously provided that the supporting elements are arranged running around the stator and support the stator at a plurality of locations on opposite sides of the rotor axis relative to the stator-receiving surface of the motor housing, so as to thus achieve a uniform spring-elastic positioning of the stator, acting on it from all sides.

Furthermore, it is preferably provided that the supporting elements have elastic bodies arranged at defined angular intervals around the rotor axis.

For example, this solution also enables cooling of the electric motor by allowing refrigerant to flow between the stator-receiving surface and the outer side of the stator and through the supporting elements parallel to the rotor axis.

In particular, the elastic bodies are positioned relative to one another on the stator-receiving surface by a band material that positions them relative to one another and runs around the stator.

A particularly simple embodiment of the elastic bodies provides that they are formed into the band material.

A particularly favorable solution provides for the band material to be in the form of a ring-like clasp with open ends, so that it can be easily deformed for assembly in the motor housing portion and thus can be inserted without material removal, in particular in a motor housing portion formed from light metal.

A particularly simple realization of the spring-elastic bodies provides that they have flank regions running at an acute angle to the outer side of the stator and/or to the stator-receiving surface between foot regions and support regions, one of which abuts against the outer side of the stator and the other of which abuts against the stator-receiving surface.

Such flank regions running obliquely to the outer side of the stator and/or to the stator-receiving surface allow a spring-elastic movement of the support regions relative to the foot regions without causing the foot regions or support regions to move in a peripheral direction around the stator, since the spring-elastic movement occurs primarily in the flank regions.

A particularly advantageous solution provides that the spring-elastic bodies are formed successively into a spring-elastic band material such that successive support regions abut against an outer side of the stator or against the stator receptacle and successive foot regions abut against the stator-receiving surface or the outer side of the stator, that is to say, the support regions and the foot regions are arranged successively in a peripheral direction around the stator, and thus the spring-elastic support of the stator relative to the stator-receiving surface is provided around substantially the entire stator.

It has also proved to be advantageous if the spring-elastic bodies are located between edge regions arranged peripherally around the stator and the support regions are connected to the edge regions by means of flank regions running at an acute angle to the outer side of the stator and/or to the stator-receiving surface.

By means of these flank regions, in particular in addition to the flank regions connecting the support regions to the foot regions, this solution provides advantageous elastic support of the support regions relative to the edge regions and, in addition, such flank regions allow the stator to be slid into the supporting elements already abutting on the stator-receiving surface due to the effect of the flank regions as an insertion chamfer, the stator being slid in parallel to the rotor axis of the electric motor.

Preferably, in this solution, on the one hand the support regions abut against the outer side of the stator or the stator-receiving surface and on the other hand the edge regions abut against the stator-receiving surface or the outer side of the stator.

In particular, the supporting elements configured according to one or more of the features described above allow the stator and housing sleeve to be decoupled, wherein on the one hand the supporting elements can be mounted in the housing sleeve without material removal and then on the other hand the stator can be mounted by being slid in, again without material removal, in particular by means of the flank regions configured as insertion chamfers, and can be removed by being pulled out, with the stator deforming the spring-elastic elements during the process of being slid in.

In particular, if the supporting elements described above are not annularly closed elements, and instead surround the stator but have ends that can be positioned peripherally at a spacing from one another, the supporting elements can be inserted easily and without damaging the housing sleeve by means of appropriate elastic deformation to reduce the outer contour.

This is particularly advantageous if the housing sleeve is made of light metal, preferably aluminum.

With regard to the configuration of the supporting elements themselves, no further details have been provided in conjunction with the previous explanation of the solution according to the invention.

For example, an advantageous solution provides that the supporting elements are formed from a spring-elastic material, in particular spring steel.

In particular, if the supporting elements are made of spring-elastic material, the stator can be slid into or pulled out of the supporting elements without material removal.

In addition, no details have yet been provided with regard to how the supporting elements are positioned in the motor housing portion.

For example, an advantageous solution for achieving a defined relative position of the supporting elements provides that supporting elements arranged successively in the direction of the rotor axis are positioned at a spacing from one another in the motor housing portion by a spacer element.

Preferably, the spacer element abuts against the stator-receiving surface of the motor housing portion in the same way as the supporting elements and holds the supporting elements at the spacing specified by the length of the spacer element in the direction of the rotor axis.

In particular, the spacer element abuts against the stator-receiving surface likewise in a manner surrounding the stator.

In order to be able to orient at least one of the supporting elements in respect of its position in the motor housing portion in a defined manner relative to the stator-receiving surface, it is preferably provided that at least one of the supporting elements is positioned in respect of its position in the motor housing portion by a step adjoining the stator-receiving surface, more specifically in that the supporting element is positioned with at least one side abutting against the step.

Alternatively or additionally, an advantageous solution provides that the overall housing has a first cover and a second cover, between which there extends a housing sleeve comprising the motor housing portion and the compressor housing portion in which a cylinder housing is provided.

The advantage of the solution according to the invention is that it creates a housing structure that is particularly easy to produce and easy to seal, and which is also particularly suitable for withstanding high internal pressures.

An advantageous solution in this regard provides that at least one contact insert for passing electrical lines into the overall housing is provided in a cover, so that the housing sleeve itself is not weakened by the attachment of a contact insert.

It is particularly advantageous if all electrical lines routed into the overall housing are guided by means of at least one contact insert in at least one of the covers of the overall housing, so that no contact insert has to be inserted into the housing sleeve and thus the housing sleeve extending between the covers is free of electrical connections.

The electrical lines routed into the overall housing comprise, on the one hand, power supply lines to the electric motor and, on the other hand, lines to a wide range of sensors arranged in the overall housing for monitoring the electric motor and/or the function of the refrigerant compressor.

Preferably, the housing sleeve has an approximately cylindrical, in particular circular-cylindrical shape, which has the advantage of high stability even when a light metal is used as the material.

For example, the housing sleeve is preferably made of light metal, in particular aluminum.

In addition, it is advantageously provided that the cylinder head has a cylinder head lower part arranged on the cylinder housing, which cylinder head lower part in turn carries a cylinder head upper part which closes off the cylinder head lower part and has at least one outlet chamber integrated therein, and that refrigerant connections (i.e. passages) for guiding refrigerant into and out of the overall housing are arranged either in the cylinder head upper part or in one of the covers, so that likewise no refrigerant connections (i.e. passages) have to be provided in the housing sleeve either and therefore the latter has optimal stability.

Furthermore, the compressor according to the invention is preferably a two-stage compressor, with an outlet chamber for medium pressure and an outlet chamber for high pressure being provided in the cylinder head upper part.

Furthermore, a refrigerant connection for supplying refrigerant, in particular refrigerant compressed to medium pressure, is preferably arranged in the cover closing off the housing portion.

In addition, it is expediently provided that the refrigerant compressor is configured for $CO_2$ as refrigerant and thus a high pressure to be generated is above 80 bar and a medium pressure to be generated is above 40 bar.

The above description of solutions according to the invention thus comprises, in particular, the various combinations of features defined by the following consecutively numbered embodiments:

1. A refrigerant compressor (10) comprising an overall housing (12) with a motor housing portion (22), in which there is arranged a motor chamber (98) having, provided therein, an electric motor (102) comprising a stator (172) and a rotor (174), and with a compressor housing portion (24) which has a compressor unit, wherein the stator (172) is mounted in the motor housing portion (98) by means of supporting elements (192, 194) inserted into the motor housing portion (98), which supporting elements on the one hand abut against a stator-receiving surface (184) of the motor housing portion (22) and on the other hand surround the stator (172) inserted into the supporting elements (192,

194) on its outer side (182) and support it spring-elastically relative to the stator-receiving surface (184).
2. A refrigerant compressor according to embodiment 1, wherein the supporting elements (192, 194) comprise spring-elastic bodies (202) which are dimensioned such that they are in an elastically deformed state in all operating states of the motor housing portion (184) occurring during operation of the refrigerant compressor (10).
3. A refrigerant compressor according to embodiment 1 or 2, wherein the supporting elements (192, 194) are arranged running around the stator (172) and support the stator (172) at a plurality of locations on opposite sides of the rotor axis (178) relative to the stator-receiving surface (184) of the motor housing portion (22).
4. A refrigerant compressor according to embodiment 2 or 3, wherein the supporting elements (192, 194) have elastic bodies (202) arranged at defined angular intervals around the rotor axis (178).
5. A refrigerant compressor according to one of the preceding embodiments, wherein the elastic bodies (202) are positioned relative to one another by a band material (208) positioning them relative to one another and running around the stator (172).
6. A refrigerant compressor according to embodiment 5, wherein the elastic bodies (202) are formed into the band material (208).
7. A refrigerant compressor according to embodiment 5 or 6, wherein the band material (208) is in the form of a ring-like clasp with open ends (210).
8. A refrigerant compressor according to one of the preceding embodiments, wherein the spring-elastic bodies (202) have flank regions (224, 226, 234, 236) running at an acute angle to the outer side (182) of the stator (172) and/or to the stator-receiving surface (184) between foot regions (228) and support regions (222), one of which abuts against the outer side (182) of the stator (172) and the other of which abuts against the stator-receiving surface (184).
9. A refrigerant compressor according to one of the preceding embodiments, wherein the spring-elastic bodies (202) are successively formed into a spring-elastic band material (208) such that successive support regions (222) abut against an outer side (182) of the stator (172) or against the stator-receiving surface (184) and successive foot regions (228) abut against the stator-receiving surface (184) or the outer side (182) of the stator (172).
10. A refrigerant compressor according to one of the preceding embodiments, wherein the spring-elastic bodies (202) are located between edge regions (212, 214) arranged peripherally around the stator (172), and the support regions (222) are connected to the edge regions (212, 214) by means of flank regions (234, 236) running at an acute angle to the outer side (182) of the stator (172) and/or to the stator-receiving surface (184).
11. A refrigerant compressor according to embodiment 10, wherein, on the one hand, the support regions (222) abut against the outer side (182) of the stator (172) or the stator-receiving surface (184) and, on the other hand, the edge regions (212, 214) abut against the stator-receiving surface (184) or the outer side (182) of the stator (172).
12. A refrigerant compressor according to one of the preceding embodiments, wherein the supporting elements (192, 194) are formed from a spring-elastic material, in particular spring steel.
13. A refrigerant compressor according to one of the preceding embodiments, wherein supporting elements (192, 194) arranged successively in the direction of the rotor axis (178) are positioned spaced apart from one another in the motor housing portion (22) by a spacer element (244).
14. A refrigerant compressor according to one of the preceding embodiments, wherein one of the supporting elements (192) is positioned in respect of its position in the motor housing portion (22) by a step (146) adjoining the stator-receiving surface (184).
15. A refrigerant compressor according to the preamble of embodiment 1 or according to one of the preceding embodiments, wherein the overall housing (12) has a first cover (14) and a second cover (18), between which a housing sleeve (16) extends, which has the motor housing portion (22) and the compressor housing portion (24) in which the compressor unit (26) is provided.
16. A refrigerant compressor according to embodiment 15, wherein at least one contact insert (252, 262) for guiding electrical lines into the overall housing (12) is provided in one of the covers (14, 18).
17. A refrigerant compressor according to embodiment 16, wherein all electrical lines guided into the overall housing (12) are guided by means of at least one contact insert (252, 262) in at least one of the covers (14, 18) of the overall housing (12).
18. A refrigerant compressor according to one of the preceding embodiments, wherein the housing sleeve (16) has an approximately cylindrical, in particular circular-cylindrical shape.
19. A refrigerant compressor according to one of the preceding embodiments, wherein the compressor housing portion (24) has a cylinder housing (52) with a cylinder head (54).
20. A refrigerant compressor according to embodiment 19, wherein the cylinder head (56) has a cylinder head lower part (62) arranged on the cylinder housing (52), which cylinder head lower part in turn carries a cylinder head upper part (66) which closes off the cylinder head lower part (62) and has at least one outlet chamber (82) integrated therein, and in that refrigerant connections (94, 96, 106) guided into the overall housing (12) are arranged either in the cylinder head upper part (66) or in one of the covers (14, 18).
21. A refrigerant compressor according to one of the preceding embodiments, wherein said compressor is a two-stage compressor, and in that an outlet chamber (78) for medium pressure and an outlet chamber (78) for high pressure are provided in the cylinder head upper part (66).
22. A refrigerant compressor according to one of embodiments 1 to 19, wherein the compressor unit (26) is configured as a spiral compressor (280).
23. A refrigerant compressor according to one of the preceding embodiments, wherein the refrigerant compressor is configured for $CO_2$ as refrigerant.

Further features and advantages of the invention are the subject of the following description as well as the graphic representation of some embodiment examples.

DETAILED DESCRIPTION OF THE INVENTION

Figure 1:
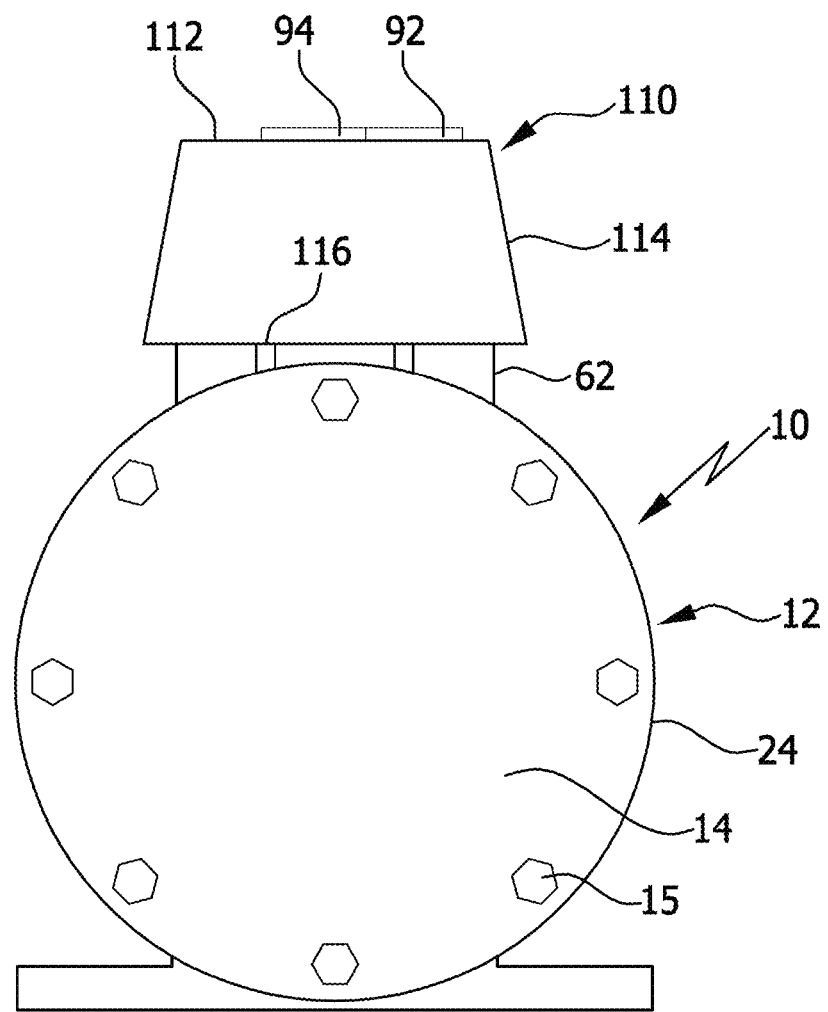
FIG. 1 shows a front view of a first embodiment example of a refrigerant compressor according to the invention.
Figure 2:
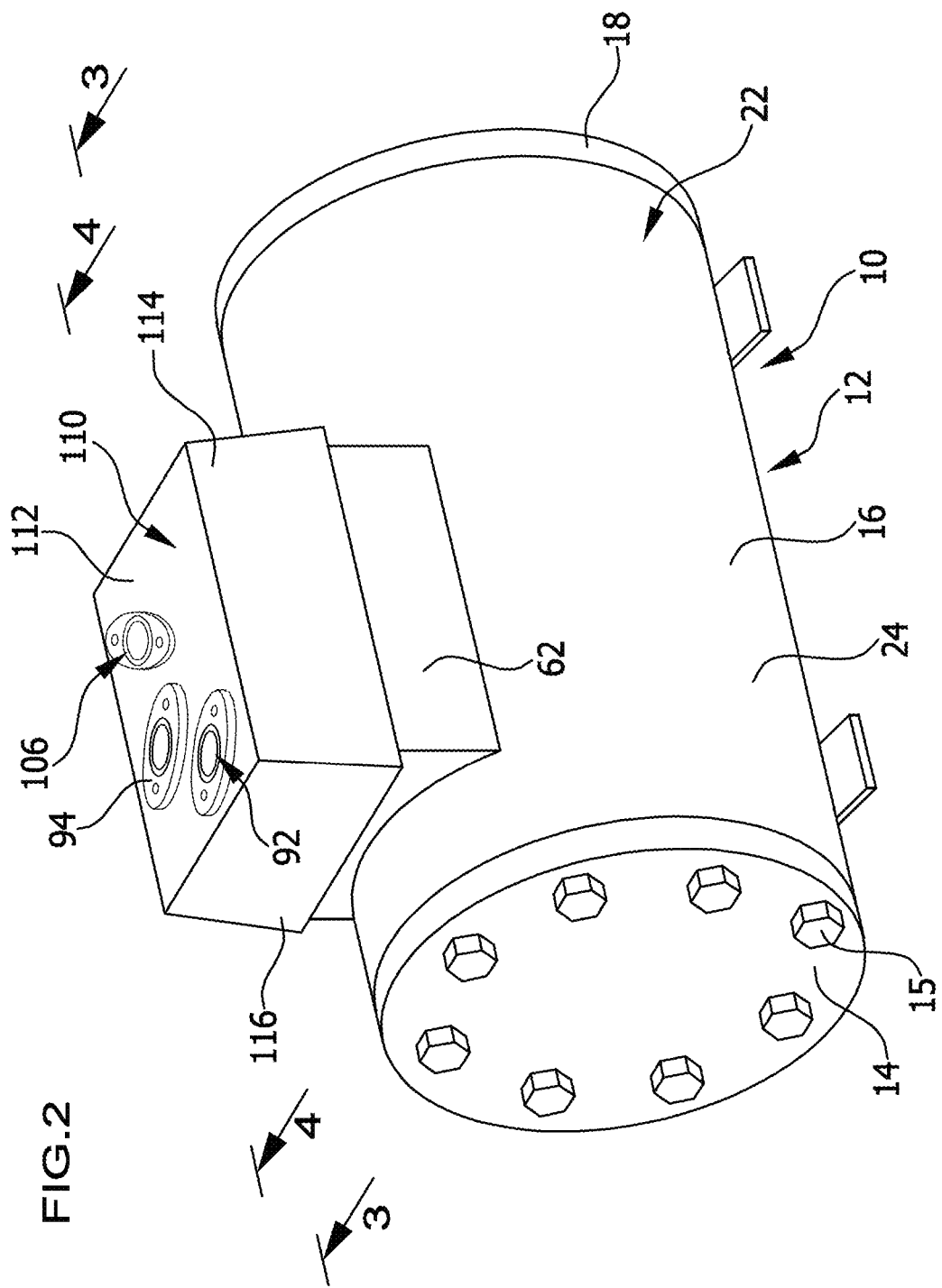
FIG. 2 shows an overall perspective view of a first embodiment example of the refrigerant compressor according to the invention.

A first embodiment example of a refrigerant compressor 10 according to the invention shown in FIGS. 1 and 2 comprises an overall housing 12, which has a first housing cover 14 at an end face, from which an approximately cylindrical, in particular circular-cylindrical, housing sleeve 16 extends to a second cover 18, the first cover 14 and the second cover 18 closing the housing sleeve 16 at one end face each and being connected to the housing sleeve 16 by screw connections 15, 19.

The housing sleeve 16 thus has an extremely advantageous cross-sectional shape in order to be able to absorb the compressive forces occurring as uniformly as possible.

This overall housing 12 further comprises a motor housing portion 22, in which a drive motor to be described in more detail below is arranged, and a compressor housing portion 24, in which there is arranged a compressor unit 26 which has a drive gear housing 32, in which a drive shaft 34 is rotatably mounted about a drive shaft axis 36, the drive shaft 34 carrying eccentric bodies 42 which act on connecting rods 44 which in turn drive pistons 46 of the compressor unit 26.

In a cylinder housing 52 also comprised by the compressor housing portion 24, the pistons 46 are guided movably in a reciprocating manner in individual cylinders 54a, 54b, and 54c of the cylinder housing 52 to compress refrigerant.

The cylinder housing 52 carries a cylinder head 56, which is formed by a cylinder head lower part 62 which is integrally molded on the cylinder housing 52 and which, in turn, also receives the cylinders 54, the cylinder head lower part 62 carrying a valve plate 64 which closes off the cylinders 54 and on which, in turn, a cylinder head upper part 66 is arranged on a side opposite the cylinder head lower part 62.

Figure 3:
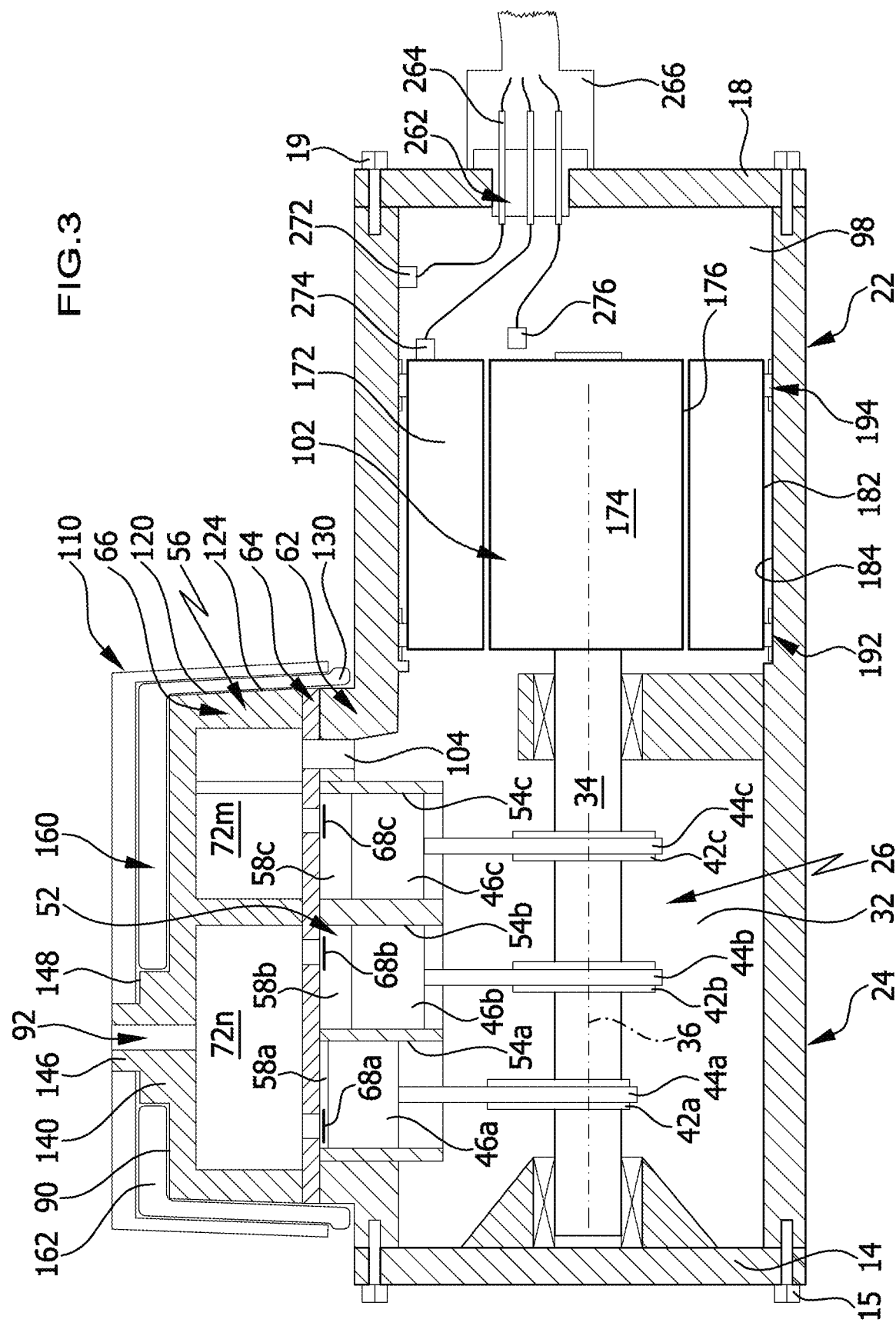
FIG. 3 shows a section along line 3-3 in FIG. 2.

The valve plate 64 not only closes off individual compression chambers 58a, 58b, 58c of the cylinders 54a, 54b, 54c on their sides opposite the pistons 46, but also carries inlet and outlet valves, with only examples of the inlet valves 68 being shown in FIG. 3.

Figure 4:
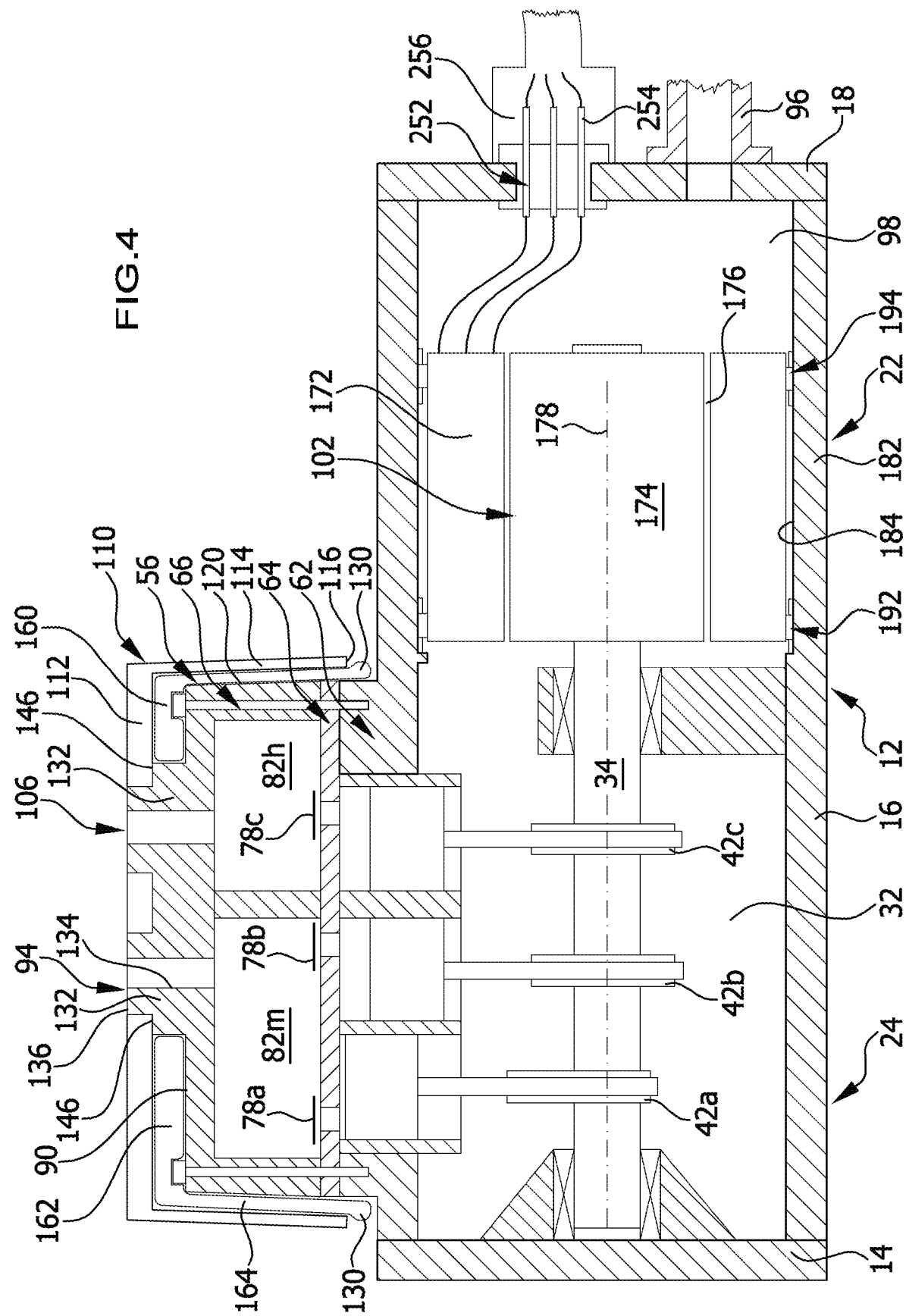
FIG. 4 shows a section along line 4-4 in FIG. 2.

According to FIG. 3, inlet chambers 72 associated with the inlet valves 68 are provided in the cylinder head upper part 66, while FIG. 4 shows outlet valves 78 in the valve plate 64, which are associated with outlet chambers 82 in the cylinder head upper part 66.

For example, the refrigerant compressor 10 is configured as a two-stage compressor in which refrigerant at intake pressure is supplied, by means of an intake connection 92 arranged on an upper side 90 of the cylinder head upper part 66 (FIG. 3), to the inlet chamber 72n, from which the refrigerant then enters the compression chambers 58a and 58b by means of the inlet valves 68a and 68b, is compressed there by the pistons 46a and 46b and enters the outlet chamber 82m (FIG. 4) by means of the outlet valves 78a and 78b, in which outlet chamber the refrigerant is then compressed to medium pressure.

By means of a pressure connection 94 likewise arranged on the upper side 90 of the cylinder head upper part 66, for example, the refrigerant can be discharged, cooled and supplied to a medium-pressure connection 96 in the overall housing 12, the medium-pressure connection 96 preferably being provided in the second housing cover 18 and thus allowing the cooled refrigerant to enter a motor chamber 98 in the motor housing portion 22, in which an electric motor denoted as a whole by 102 is cooled and, after cooling of the electric motor 102, the refrigerant, as shown in FIG. 3, can in turn enter the inlet chamber 72m by means of a housing passage 104, from which inlet chamber the refrigerant present at medium pressure enters the compression chamber 58c by means of the inlet valve 68c, is compressed therein, and enters the outlet chamber 82h in the cylinder head upper part 62 by means of the outlet valve 78c, in which cylinder head upper part the refrigerant is then at high pressure (FIG. 4).

From this outlet chamber 82h, the refrigerant can then in turn be supplied to a refrigerant circuit by means of a pressure connection 106 arranged on the upper side 90 of the cylinder head upper part 66.

In this solution, refrigerant compressed to medium pressure is thus present in the overall housing 12, in particular in the drive chamber 32 and also in the motor chamber 98, so that, for example, when the refrigerant compressor 10 is used in a refrigerant circuit with $CO_2$ as refrigerant, high pressures of 40 bar and more are already present in the overall housing 10.

In order to be able to produce the overall housing 10 with the lowest possible weight, the housing sleeve 16 with the housing covers 14 and 18 is made of light metal, in particular aluminum, and, in the same way, so too is the cylinder head lower part 62 molded thereon. The use of light metal, in particular aluminum, also offers the advantage that the housing sleeve 16 and the housing covers 14, 18 are corrosion-resistant.

Preferably, the valve plate 64 is made of steel and the cylinder head upper part 66 is also formed in the same way, since in the outlet chambers 82m and 82h of the cylinder head upper part there is medium pressure on the one hand and high pressure on the other, which can reach more than 80 bar, especially with $CO_2$ as the refrigerant, so that these components would not withstand the mechanical oscillating loads if they were made of light metal.

To protect the cylinder head 56, in particular the cylinder head upper part 66, a hood denoted as a whole by 110 is provided, which on the one hand has a hood cover 112 engaging over an upper side 90 of the cylinder head upper part 66, from which hood cover a hood skirt 114 extends in the direction of the housing sleeve 16 and ends in an edge region 116.

The purpose of the hood 110 is to protect the cylinder head 56, in particular the cylinder head upper part 62 and, if necessary, also the valve plate 64, against the effects of weather and aggressive media.

To achieve this, a seal is provided between the hood skirt 114 and a peripheral side 120 of the cylinder head 56 by means of a sealing body 130 made of an elastic material, for example silicone, shown in FIGS. 3 and 4, preferably in the form of a bead, which is preferably compressed between the edge region 116 and the peripheral side 120 of the cylinder head 56, the sealing body 130 preferably being acted upon on the one hand by the edge region 116 and on the other hand by a peripheral region 122 of the peripheral side 120 of the cylinder head 56, which surrounds the cylinder head lower part 62.

Thus, no moisture or other medium is able to penetrate into a space between the hood skirt 114 having the edge region 116 of the hood 110 and the peripheral side 120 of the cylinder head 56 and is prevented from causing damage to the material of the valve plate 64 or the cylinder head upper part 66 at its peripheral region 124 of the peripheral side 120.

Figure 5:
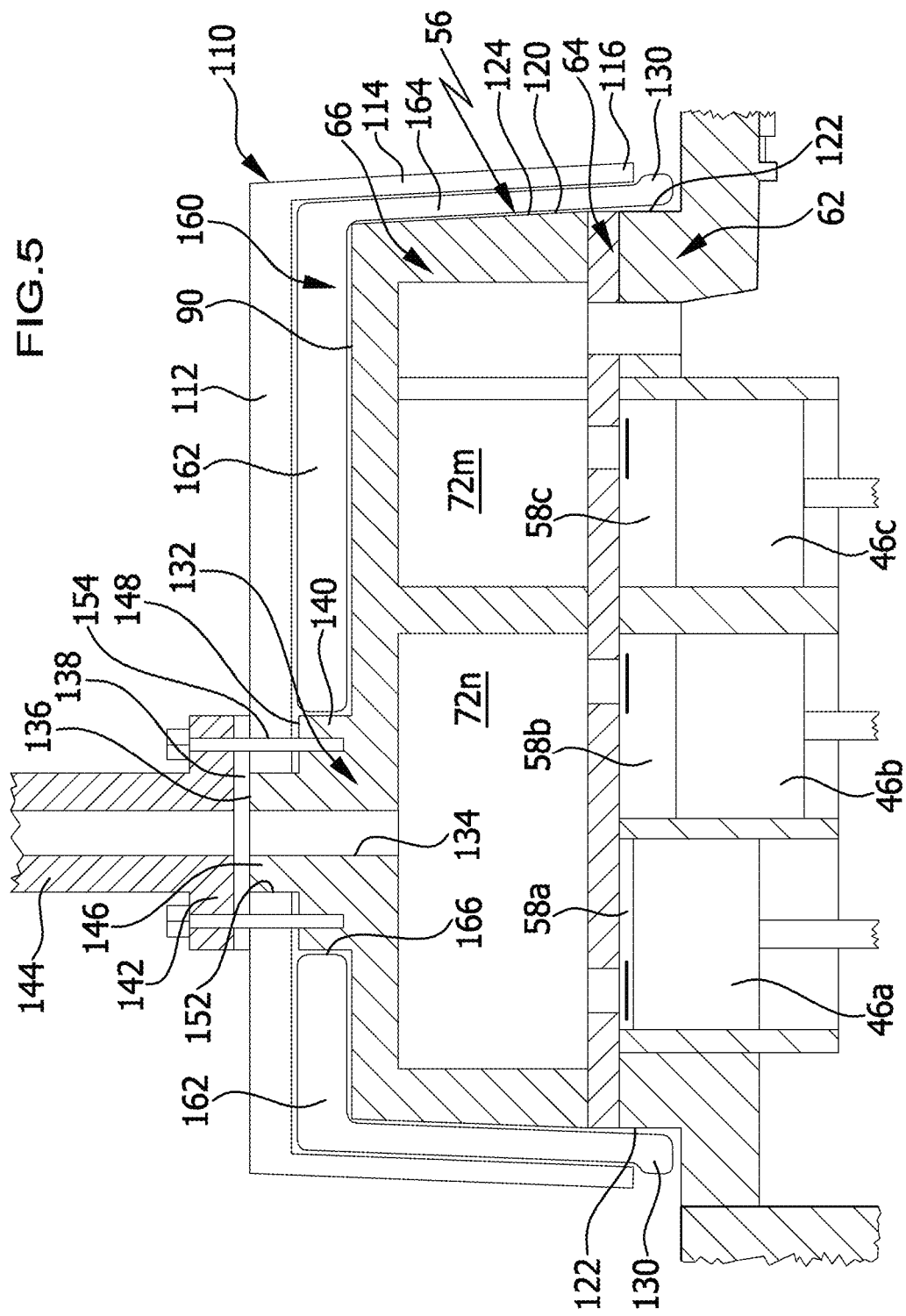
FIG. 5 shows an enlarged sectional view in the region of a cylinder head upper part.

In order to also prevent moisture or any other medium from penetrating under the hood 110 in the region of the hood cover 112, the intake connection 92, the pressure connection 94 and the pressure connection 106 are preferably each formed by connection attachments 132 arranged in the cylinder head upper part 66 and projecting beyond the latter on the upper side 90 opposite the valve plate 64, which connection attachments in each case surround a passage 134 leading to the corresponding inlet chamber 72 or outlet chamber 82 and, on a side facing away from the upper side 90, form a sealing surface 136 on which a seal 138, in particular a flat seal, can be placed which, for its part, can be pressed against the sealing surface 136 by a connection flange 142 connected to a connection line 144 when the connection flange is screwed to the respective connection attachment 132 of the cylinder head upper part 66 (FIG. 5).

Preferably, the connection attachment 132 is formed in each case in such a way that it has a foot region 140, from which a connection extension 146 surrounding the passage 134 extends to the sealing surface 136 and forms a step 148 at a spacing from the sealing surface 136, which step is formed peripherally around the connection extension 146 and the passage 134 and forms a support for the hood cover 112, which is provided in the region of the connection attachment 132 with an edge region 154 which engages around the connection extension 146 and has an aperture 152, so that the hood cover 112 can be held at a spacing from the cylinder head upper part 66, in particular the upper side 90 thereof, in particular by the respective steps 148 formed at the intake connection 92, the pressure connection 94 and the pressure connection 106 (FIG. 5).

Preferably, a sealing element denoted as a whole by 160 is arranged between the hood 110 and the cylinder head upper part 66 and preferably abuts on the upper side 90 of the cylinder head upper part 66 with a contact body 162 which is provided with recesses 166 so that the connection attachments 132 can penetrate it and the contact body 162 thus surrounds the connection attachments 132.

Further, a casing body 164 of the sealing element 160 extends from the contact body 162 to the sealing body 130, which is integrally molded on the casing body 164.

The casing body 164 is located between the peripheral side 120 of the cylinder head 56 and the hood skirt 114, and although a seal between the peripheral side 120 and the hood skirt 114 may be provided in the region of the casing body 164, this is not absolutely necessary, since the primary seal is provided by the sealing body 130, which provides its sealing effect between the edge region 116 of the hood 110 and the peripheral region 122 of the cylinder head lower part 62.

However, it is still possible prophylactically to obtain an additional sealing effect by suitable construction of the casing body 164, for example by means of beads or ribs formed therein.

Also, in principle, the contact body 162 is not configured to provide a seal across the full area between the hood cover 112 of the hood 110 and the upper side 90 of the cylinder head upper part 66, but advantageously the contact body 162 is configured to provide an additional seal between the hood cover 112 and the upper side 90 in regions around the connection attachments 132 of the cylinder head upper part 66.

Primarily, however, the contact body 162 as well as the casing body 164 serve to precisely and reliably and permanently position the sealing body 130 so that it can permanently and reliably provide its sealing effect between the edge region 116 and the cylinder head lower part 62 in the peripheral region 122, which represents a part of the peripheral side 120 of the cylinder head 56.

Preferably, the sealing element 160 is formed with the contact body 162, the casing body 164 and the sealing body 130 as a one-piece pre-formed part made of a silicone material, which can be placed as a whole over the cylinder head 56, in particular the cylinder head upper part 66 thereof, before the hood 110 is fitted.

Figure 6:
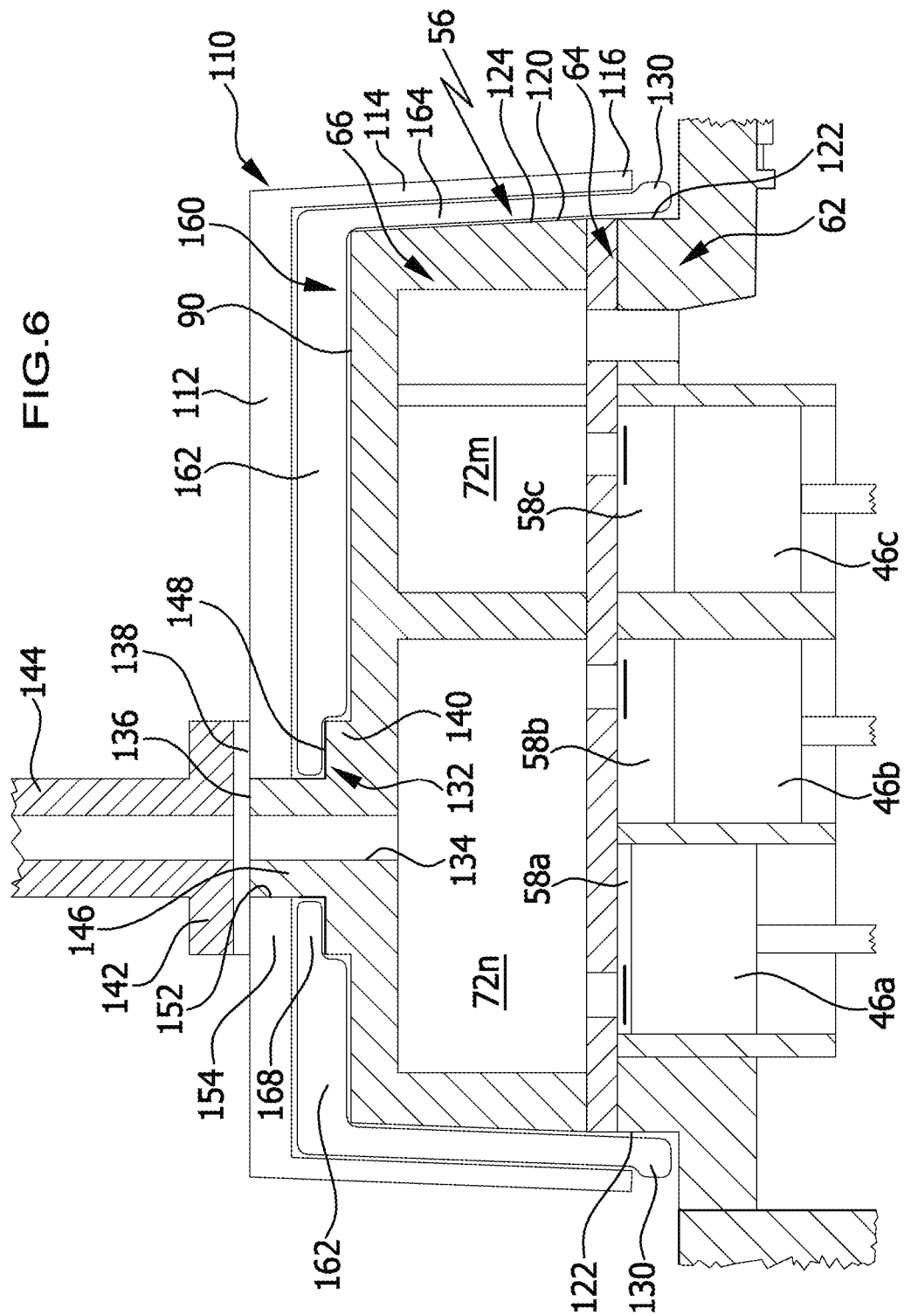
FIG. 6 shows a sectional view similar to FIG. 5 through a second embodiment example of a refrigerant compressor according to the invention.

In a second embodiment example of the solution according to the invention shown in FIG. 6, the contact body 162 is provided in the region of the recesses 166 with an annular flange 168 reaching as far as the connection extension 146, which flange abuts on the step 148 and on which, in turn, the hood cover 112 abuts with its edge region 154 supporting the aperture 152, so that the edge region 154 is flexibly supported on the support surface 148 due to the forming of the annular flange 168 from the elastic material of the sealing element 160, and thus compensation for thickness tolerances in the edge region 154 is possible, so that the seal 138, which is acted upon by the connection flange 142 acted upon by screw fittings, can also still provide a tight connection in the edge region 154 of the hood cover 112 and additionally fixes the hood 110 as a whole.

As a further alternative to the first and second embodiment examples, solutions are also conceivable in which connection extensions are not arranged on the upper side 90 of the cylinder head upper part 66, but on the peripheral side 120 thereof.

In this case, too, it is possible to achieve a seal by means of the sealing element 160 in the region of the connection attachments 132, in a manner similar to that in the region of the upper side of the cylinder head upper part 66.

For example, in this case the hood 110 could be made in two parts.

In a further embodiment example, the cylinder head upper part 66 is not provided with any connection attachment and can likewise be covered by the hood 110 in the same way as described for the previous solutions.

Moreover, in the second embodiment example, those elements which are identical to the first embodiment example are provided with the same reference sign, so that reference can be made in this respect to the explanations provided in relation the first embodiment example.

As shown in FIGS. 3 and 4, in both embodiment examples, the motor chamber 98 of the overall housing 12 houses the electric motor 102, which has a stator 172 that is non-rotatably mounted in the motor housing portion 22 and a rotor 174 that is surrounded by the stator 172 and rotatable about a rotor axis 178 that coincides with the drive shaft axis 36 in the present embodiment examples.

A gap 176 is formed between the rotor 174 and the stator 172.

Figure 7:
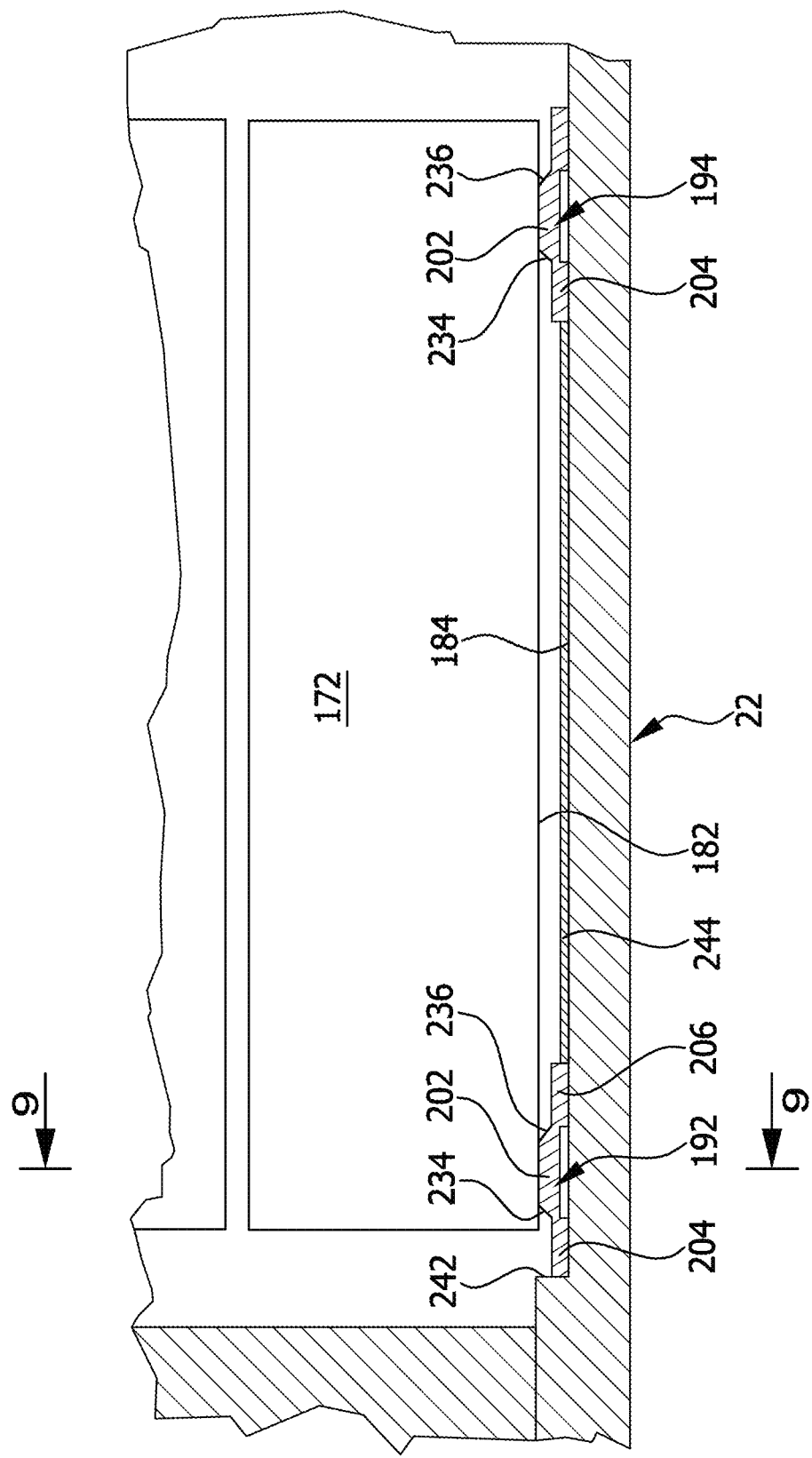
FIG. 7 shows a longitudinal section through the overall housing according to FIG. 2 in the region of a motor housing portion.

The stator 172 is preferably mounted in the motor housing portion 22, as shown in FIGS. 3, 4 and 7, by supporting elements 192 and 194 acting between an outer surface 182 of the stator 172 and a stator-receiving surface 184 of the motor housing portion 22, which supporting elements are spring-elastically deformable in a radial direction in relation to the rotor axis 178 and support the stator 172 relative to the stator-receiving surface 184.

Figure 8:
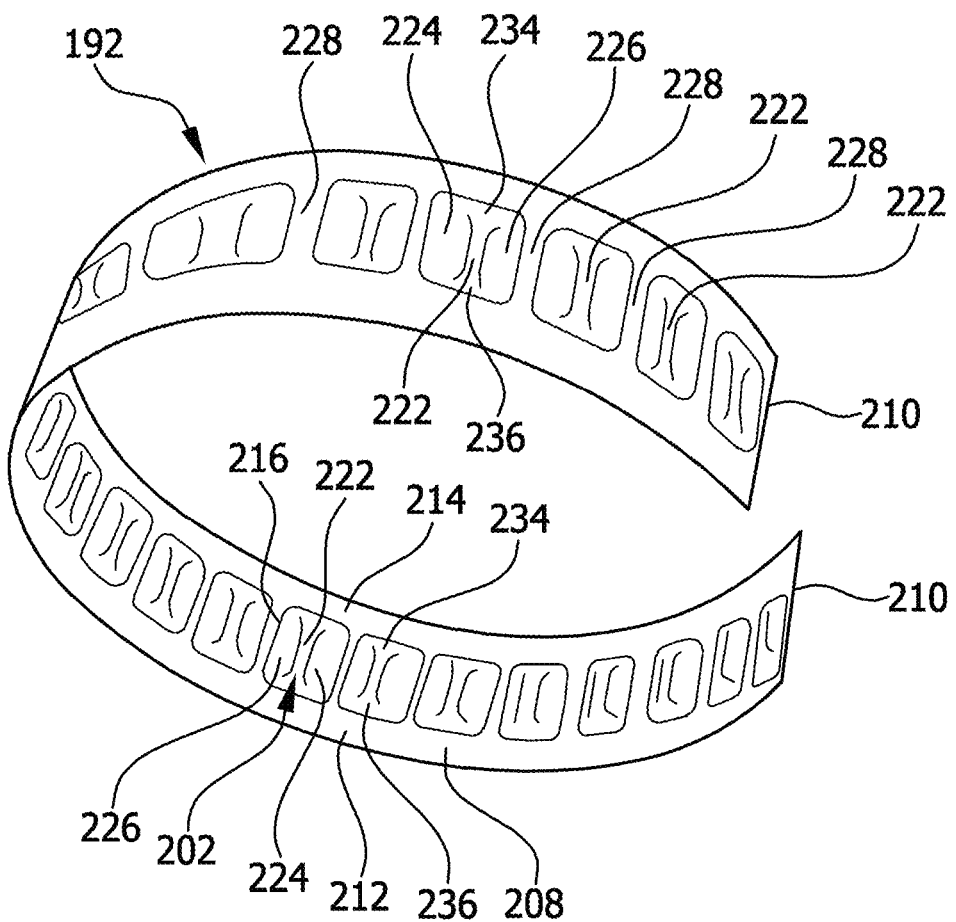
FIG. 8 shows a perspective view of a supporting element for mounting a stator in the motor housing portion.
Figure 9:
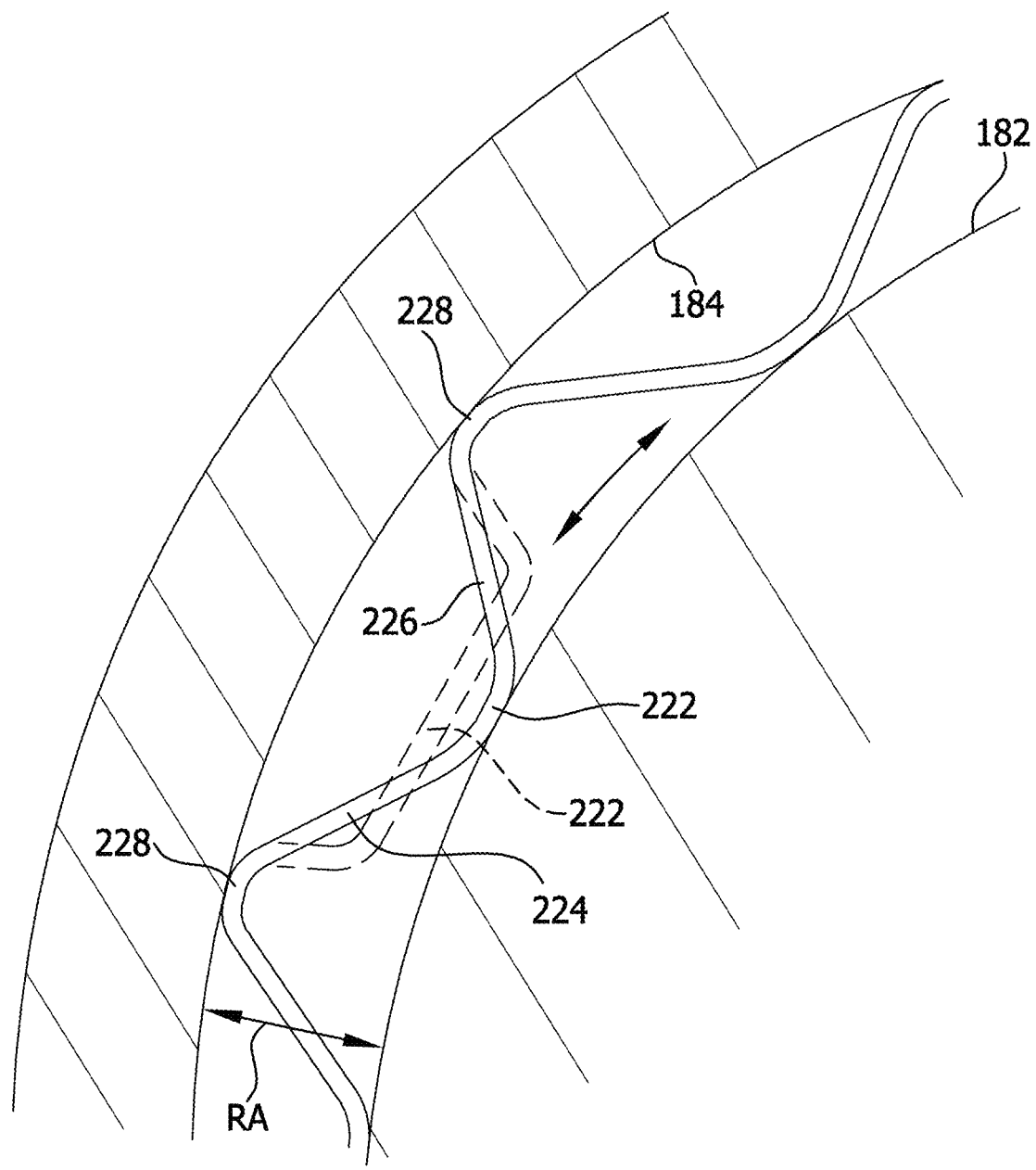
FIG. 9 shows part of a sectional view along line 9-9 in FIG. 7.

Preferably, each of the supporting elements 192, 194, as shown for example in FIGS. 8 and 9, comprises spring-elastically deformable bodies 202 in a radial direction in relation to the rotor axis 178, which bodies for example support the stator 172 at the outer side 182, and retaining elements 204 and 206 arranged on both sides of the spring-elastically deformable bodies 202, as considered in the direction of the rotor axis 178, and connecting the elastic bodies 202 to each other, which retaining elements are supported at the stator-receiving surface 184 of the motor housing portion 22.

However, it is also possible for the retaining elements 204 and 206 to be supported at the outer side 182 of the stator 172 and for the elastically deformable bodies 202 to be supported at the stator-receiving surface 184 of the motor housing portion 22.

As shown by way of example in FIGS. 8 and 9 in conjunction with the supporting element 192, these supporting elements 192, 194 can be produced by a band material 208 in the form of an annular clasp with ends 210 which are spaced apart from one another, the edge regions 212 and 214 of which band material form the retaining elements 204 and 206 and in the central region 216 of which band material the elastically deformable bodies 202 are formed by structures impressed in the band material 208, which structures rise between the edge regions 212 and 214 and form support regions 222, which abut against the outer side 182 of the stator 172 and in the peripheral direction around the rotor axis 178 are connected by means of rising flank regions 224 and 226, which run at an acute angle to the surface supporting them, in FIG. 9 at an acute angle to the stator-receiving surface 184, to foot regions 228 which abut against the stator-receiving surface 184, and in addition are connected to the edge regions 212 and 214, which likewise abut against the stator-receiving surface 184, in a direction parallel to the rotor axis 178 by means of flank regions 234 and 236 running at an acute angle to the supporting stator-receiving surface 184.

By forming the supporting elements 192, 194 from a band material 208 with ends 210 spaced apart from one another, they can be inserted into the stator-receiving surface 184 without any material removal.

In particular, the flank regions 234 and 236 form insertion chamfers that allow for assembly or disassembly of the stator 172 without any material removal.

In particular, the supporting elements 192, 194 allow the "hard" stator 172 to be mounted in the "soft" motor housing portion 22 if this is made of light metal, in particular aluminum, without causing any damage to the motor housing portion 22; the same applies when replacing the electric motor 102.

Furthermore, the configuration of the housing sleeve 16 with a cross-sectional shape that is as circular-cylindrical as possible is also advantageous in this case, since the forces required to receive the electric motor 102 and the compressive forces can also be optimally absorbed in the motor housing portion 22 in this case, in particular without any appreciable widening of the motor housing portion 22, so that, in turn, precise mounting of the electric motor 102 by the supporting elements 192 and 194 is possible.

Due to the flank regions 224 and 226 and also 234 and 236 running with a gentle gradient to the surface supporting them, in FIG. 9 to the stator-receiving surface 184, the spring-elastic deformation of the deformable bodies 202 occurs primarily in the flank regions 224, 226 and 234 and 236, as shown in FIG. 9 at the flank regions 224 and 226 in a dashed manner.

Preferably, the spring-elastic bodies 202 are configured in such a way that they follow all variations of the radial spacing RA (FIG. 9) between the outer side 182 of the stator 172 and the stator-receiving surface 184 by elastic deformation, without plastic deformations occurring in the region of the elastic bodies 202, in particular the flank regions 224, 226 as well as 234 and 236.

This makes it possible to keep the stator 172 always coaxial with the rotor axis 178, irrespective of the thermal and/or pressure-induced radial expansion of the motor housing portion 22 and the thermally induced radial expansion of the stator 172.

Such pressure-induced radial expansions of the motor housing portion 22 occur in particular because the motor chamber 98 is at medium pressure and the housing sleeve 16 of the overall housing 12 is made of light metal.

In addition to the pressure load on the motor housing portion 22, there is also thermal expansion depending on the operating state of the stator 172 and the motor housing portion 22.

Since all such deformations, which have the effect of changing the radial spacing RA, are absorbed by the spring-elastic bodies 202 in the form of purely elastic deformations, an optimally small gap 176 between the rotor 174 and the stator 172 can be maintained regardless of the operating state of the refrigerant compressor.

Since all of the elastic elements 202 are, for example, in a band material 208 and are held in their positions relative to each other by the retaining elements 204 and 206, the retaining elements 204 and 206 can be arranged running in a practically closed manner around the stator 172 in planes running perpendicular to the rotor axis 178, thereby holding the elastic elements 202 in defined positions relative to the outer side 182 of the stator 172 and to the stator-receiving surface 184.

For exact positioning of the supporting elements 192 and 194 in the motor housing portion 122, a step 242 is preferably provided adjacently to the rotor receiving surface 184, specifically on a side facing the drive chamber 22, which step 242 runs around the rotor axis 178 and serves to position one of the supporting elements 192 facing the drive chamber 32.

In order to be able to position the second supporting element 194 precisely relative to the first supporting element 192, it would in principle be conceivable to also provide a step in the motor housing portion 22, but this would mean a further weakening of a wall thickness of the motor housing portion 22.

For this reason, a spacer element 244 is provided between the supporting elements 192 and 194 as shown in FIG. 7, which spacer element, for example, abuts against the retaining elements 206 and 204 of the supporting elements 192 and 194 respectively and thus predetermines the exact position of the second supporting element 194 relative to the first supporting element 192.

For example, the spacer element 244 is configured to abut against the stator-receiving surface 184 of the motor housing portion 22 and to run partially or completely around the rotor axis 178 to keep the supporting elements 192 and 194 in relatively precise positions throughout their extent around the rotor axis 178.

For example, the supporting elements 192, 194 and/or the spacer element 244 are formed by annular sheet-metal elements, in particular made from band material 208, having ends 210 spaced apart from one another which tend to widen in the radial direction so that these sheet-metal elements automatically abut against the stator-receiving surface 184 and are fixed by frictional engagement.

This allows the supporting elements 192, 194 and, as applicable, the spacer element 244 to be inserted into the stator-receiving surface 184 without material removal.

For the electrical supply of the electric motor 102, a contact insert 252 is preferably provided in the second cover 18, which contact insert receives electrical contact elements 254 that are passed through the second cover 18 (FIG. 4).

On a side facing away from the motor chamber 98, a contact plug 256 can be plugged onto the contact insert 252, by means of which contact is made with all the contact elements 254 received in the contact insert 252.

Furthermore, a second contact insert 262 is provided in the second cover 18 (FIG. 3) and has additional electrical contact elements 264. Preferably, these additional contacts 264 serve to establish electrical connections to sensors arranged in the overall housing 12, for example pressure sensors 272, and/or temperature sensors 274 and/or rotary speed sensors 276, which serve to monitor the compressor function and the motor function, so that an electrical supply line to all sensors serving for the compressor function and/or the motor function and arranged in the overall housing 12 is preferably provided by means of the contact insert 262 and a contact plug 266.

However, it is also possible to provide all electrical contact elements 254 and 264 in a contact insert of correspondingly complex configuration.

In addition, the second cover 18 (FIG. 4) also includes the medium-pressure connection 96, by means of which refrigerant under medium pressure can be supplied directly to the motor chamber 98, specifically on a side opposite the drive chamber 32, and flows through the electric motor 102, cools it, before then entering the inlet chamber 72m.

Figure 10:
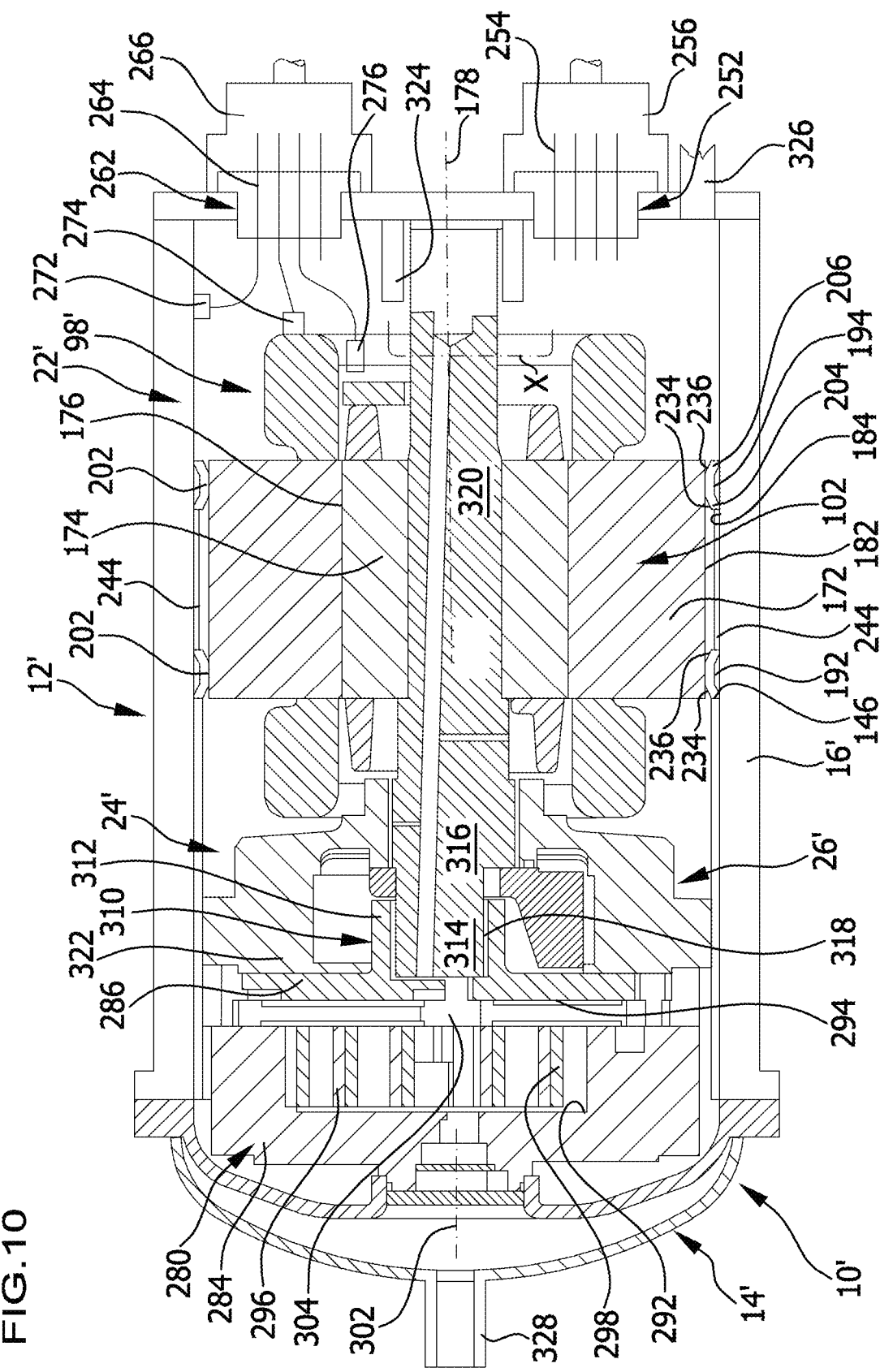
FIG. 10 shows a longitudinal section similar to FIG. 2 through a second embodiment example of a refrigerant compressor according to the invention.

In a second embodiment example, shown in FIG. 10, those elements which are identical to those of the first embodiment example are provided with the same reference signs, so that reference can be made to the explanations of the first embodiment example in this respect.

In particular, the second embodiment example of a refrigerant compressor 10' according to the invention comprises an overall housing 12', which has a first housing cover 14' on an end face, from which an approximately cylindrical, in particular circular-cylindrical housing sleeve 16' extends to a second cover 18', the first cover 14' and the second cover 18' closing the housing sleeve 16' at one end face each and being connected to the housing sleeve 16' in so doing.

In the second embodiment example, the housing sleeve 16' also has an extremely advantageous cross-sectional shape in order to be able to uniformly absorb the compressive forces occurring in particular radially, which forces occur in particular when $CO_2$ is used as a refrigerant.

This overall housing 12' also comprises the motor housing portion 22', in which the motor chamber 98' for receiving the electric motor 102 is arranged, and a compressor housing portion 24', in which a compressor unit 26' is arranged, but which is formed as a spiral compressor 280, also referred to as a scroll compressor.

In particular, the spiral compressor 280 comprises a first compressor body 284 arranged in a stationary manner in the compressor housing portion 24 and a second compressor body 286 arranged movably in the compressor housing portion 24, each having spiral ribs 296 and 298, respectively, rising above a base 292 and 294, respectively, which mesh with one another in such a way that the second compressor body 286 is movable relative to the first compressor body 284 on an orbital path about a central axis 302 for compressing refrigerant.

Further, the second compressor body 286 is guided, for example, by a known Oldham coupling 304 relative to the stationary first compressor body 284.

The spiral compressor 280 is driven here by a drive gear, denoted as a whole by 310, which comprises an eccentric receiver 312 fixedly connected to the second compressor body 286, preferably arranged integrally therewith, and engaged by an eccentric 314 rotating about the central axis 302 to move the second compressor body 286 along the orbital path about the central axis 302.

Preferably, the eccentric 314 engages a receptacle 316 formed by the eccentric receiver 312, and abuts against it with outer peripheral surfaces 318.

Alternatively, however, it is also conceivable for the eccentric 314 to engage externally around the eccentric receiver 312.

The eccentric 314 is molded here on a drive shaft denoted as a whole by 320, which drive shaft is rotatably mounted coaxially with the central axis 34 and runs approximately parallel to a central axis of the housing sleeve 16'.

For this purpose, the drive shaft 320 is mounted on a first bearing unit 322 facing the spiral compressor 280, and on an opposite side in a second bearing unit 324, which is held, for example, on the second cover 18'.

Both bearing units 322 and 324 are thus directly or indirectly supported on the overall housing 12' of the refrigerant compressor 10' while holding the drive shaft 320 substantially horizontally therein.

Also in the second embodiment example, the stator 172 of the electric motor 102 is supported on the motor housing portion 22 by the supporting elements 192 and 194, which are formed in the same manner as in the first embodiment example and also support the stator 172 in the same manner on opposite sides of the rotor axis 178, which is coaxial with the drive shaft 320.

Here, the supporting elements 192, 194 are arranged between the outer side 182 of the stator 172 and the stator-receiving surface 184 and are formed and act in the same manner as in the first embodiment example.

Consequently, with regard to all features of the supporting elements 192 and 194 as well as their interaction with the stator 172, reference is made fully to the explanations relating to the first embodiment example as well as the graphical representation in FIGS. 8 and 9.

In the second embodiment example, it is thus also possible to support the stator 172 spring-elastically relative to the stator-receiving surface 184 on the one hand in order to be able to compensate for diameter variations of the stator-receiving surface 184 and the motor housing portion 22' and, at the same time, to keep the stator 172 centered in the motor housing portion 22'.

In addition, this enables the gap 176 between the stator 172 and the rotor 174 to be kept as small as possible, thus achieving a high efficiency of the electric motor 102, as also described in conjunction with the first embodiment example.

For the electrical supply of the electric motor 102, a contact insert 252 is provided in the second cover 18' in the same manner as in the first embodiment example, which contact insert 252 receives electrical contacts 254 that are guided through the second cover 18', as also shown in FIG. 10.

On a side facing away from the motor chamber 98, a contact plug 256 can be plugged onto the contact insert 252, by means of which contact is made with all the contact elements 254 received in the contact insert 252.

In addition, a second contact insert 262 is provided in the second cover 18' and has additional electrical contact elements 264, which preferably serve to establish electrical connections to sensors arranged in the overall housing, for example the pressure sensors 272 and/or the temperature sensors 274 and/or rotary speed sensors 276, which serve to monitor the compressor function and the motor function.

In the same manner as in the first embodiment example, the contact elements 264 of the contact insert 262 are contacted with a contact plug 266.

In addition, the second cover 18' is also provided with an intake connection 326, by means of which refrigerant to be drawn in can be supplied to the motor chamber 98', and, after passing through the motor chamber 98', enters the spiral compressor 280, is compressed thereby, and is discharged as compressed refrigerant by means of a pressure connection 328 in the first cover 14'.

The invention claimed is:

1. A refrigerant compressor comprising an overall housing with a motor housing portion, in which there is arranged a motor chamber having, provided therein, an electric motor comprising a stator and a rotor, and with a compressor housing portion which has a compressor unit,
the stator is mounted in the motor housing portion by supports inserted into the motor housing portion, which supports on the one hand abut against a stator-receiving surface of the motor housing portion and on the other hand surround the stator inserted into the supports on its outer side and support it elastically relative to the stator-receiving surface, and wherein the supports have elastic bodies arranged at defined angular intervals around the rotor axis, enabling cooling of the electric motor by allowing refrigerant to flow between the stator receiving surface and the outer side of the stator and through the supports, wherein the supports are arranged successively in the direction of the rotor axis and are positioned spaced apart from one another in the motor housing portion by a spacer element, and wherein the spacer element is inserted into the stator-receiving surface.

2. The refrigerant compressor of claim 1, wherein the stator surrounds the rotor with only a gap therebetween.

3. The refrigerant compressor according to claim 2, wherein the elastic bodies are spring-elastic bodies supporting the stator elastically relative to the stator-receiving surface, the elastic bodies being dimensioned such that they are in an elastically deformed state in all operating states of the motor housing portion occurring during operation of the refrigerant compressor.

4. The refrigerant compressor according to claim 2, wherein the supports are arranged running around the stator and support the stator at a plurality of locations on opposite sides of the rotor axis relative to the stator-receiving surface of the motor housing portion.

5. The refrigerant compressor according to claim 2, wherein the elastic bodies are positioned relative to one another by a band material positioning them relative to one another and running around the stator.

6. The refrigerant compressor according to claim 5, wherein the elastic bodies are formed into the band material.

7. The refrigerant compressor according to claim 5, wherein the band material is in the form of a ring-like clasp with open ends.

8. The refrigerant compressor according to claim 2, wherein the elastic bodies have flank regions running at an acute angle to the outer side of the stator and/or to the stator-receiving surface between foot regions and support regions, one of which abuts against the outer side of the stator and the other of which abuts against the stator-receiving surface.

9. The refrigerant compressor according to claim 2, wherein the elastic bodies are successively formed into a spring-elastic band material such that successive support regions abut against an outer side of the stator or against the stator-receiving surface and successive foot regions abut against the stator-receiving surface or the outer side of the stator.

10. The refrigerant compressor according to claim 2, wherein the elastic bodies are located between edge regions arranged peripherally around the stator, and the support regions are connected to the edge regions by means of flank regions running at an acute angle to the outer side of the stator and/or to the stator-receiving surface.

11. The refrigerant compressor according to claim 10, wherein, on the one hand, the support regions abut against the outer side of the stator or the stator-receiving surface and, on the other hand, the edge regions abut against the stator-receiving surface or the outer side of the stator.

12. The refrigerant compressor according to claim 2, wherein the supports are formed from a spring-elastic material.

13. The refrigerant compressor of claim 12, wherein the spring-elastic material is spring steel.

14. The refrigerant compressor according to claim 2, wherein one of the supports is positioned in respect of its position in the motor housing portion by a step adjoining the stator-receiving surface.

15. The refrigerant compressor according to claim 2, wherein the compressor unit is configured as a spiral compressor.

16. The refrigerant compressor according to claim 2, wherein the spring-elastic material is spring steel.

17. The refrigerant compressor of claim 1, wherein the overall housing has a first cover and a second cover, between which a housing sleeve extends, which has the motor housing portion and the compressor housing portion in which the compressor unit is provided, and wherein at least one contact insert for guiding electrical lines into the overall housing is provided in at least one of the first and second covers, and wherein the housing sleeve extends between the first cover and the second cover as one piece.

18. The refrigerant compressor according to claim 17, wherein all electrical lines guided into the overall housing are guided by means of at least one contact insert in at least one of the covers of the overall housing.

19. The refrigerant compressor according to claim 17, wherein the housing sleeve has a cylindrical shape.

20. The refrigerant compressor of claim 19, wherein the housing sleeve has a circular-cylindrical shape.

21. The refrigerant compressor according to claim 17, wherein the compressor housing portion has a cylinder housing with a cylinder head.

22. The refrigerant compressor according to claim 21, wherein the cylinder head has a cylinder head lower part arranged on the cylinder housing, which cylinder head lower part in turn carries a cylinder head upper part which closes off the cylinder head lower part and has at least one outlet chamber integrated therein, and wherein in either the cylinder head upper part or in at least one of the first and second covers, refrigerant passages are arranged which guide refrigerant into the overall housing.

23. The refrigerant compressor according to claim 2, wherein said compressor is a two-stage compressor, and in that an outlet chamber for medium pressure and an outlet chamber for high pressure are provided in a cylinder head upper part.

24. The refrigerant compressor according to claim 17, wherein the refrigerant compressor is configured for $CO_2$ as refrigerant.

25. The refrigerant compressor according to claim 1, wherein the spacer element is a band material.

26. The refrigerant compressor according to claim 25, wherein the band material has ends spaced apart from one another which tend to widen in the radial direction so that sheet-metal elements thereof automatically abut against the stator-receiving surface and are fixed by frictional engagement.

27. The refrigerant compressor according to claim 1, wherein the spacer element is inserted into the stator-receiving surface without material removal of the stator-receiving surface.

* * * * *